(12) United States Patent
Lee et al.

(10) Patent No.: US 11,781,822 B2
(45) Date of Patent: Oct. 10, 2023

(54) OIL PUMP AND VEHICLE HAVING THE SAME, AND METHOD OF CONTROLLING VEHICLE

(71) Applicants: Hyundai Motor Company, Seoul (KR); Kia Motors Corporation, Seoul (KR)

(72) Inventors: JaeHyeon Lee, Gyeonggi-do (KR); Jiwan Cha, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 553 days.

(21) Appl. No.: 16/952,542

(22) Filed: Nov. 19, 2020

(65) Prior Publication Data
US 2021/0310755 A1    Oct. 7, 2021

(30) Foreign Application Priority Data
Apr. 1, 2020  (KR) .................. 10-2020-0039724

(51) Int. Cl.
| | | |
|---|---|---|
| *F28F 27/00* | (2006.01) | |
| *F04B 49/20* | (2006.01) | |
| *B60L 1/00* | (2006.01) | |
| *B60K 1/00* | (2006.01) | |
| *F04B 53/20* | (2006.01) | |

(52) U.S. Cl.
CPC .............. *F28F 27/00* (2013.01); *B60L 1/003* (2013.01); *F04B 49/20* (2013.01); *B60K 1/00* (2013.01); *B60K 2001/003* (2013.01); *B60K 2001/006* (2013.01); *F04B 53/20* (2013.01); *F04B 2205/10* (2013.01); *F28F 2250/08* (2013.01)

(58) Field of Classification Search
CPC ....... F28F 27/00; F28F 2250/08; B60L 1/003; F04B 49/20; F04B 53/20; F04B 2205/10; B60K 1/00; B60K 2001/006; B60K 2001/003
See application file for complete search history.

(56) References Cited

U.S. PATENT DOCUMENTS

2022/0185122 A1*  6/2022  Fukunaga .............. H02K 7/116

* cited by examiner

*Primary Examiner* — Jacob M Amick
(74) *Attorney, Agent, or Firm* — Fox Rothschild LLP

(57) ABSTRACT

A method of controlling a vehicle includes steps of: detecting a temperature of oil; detecting a temperature of a drive motor; identifying a target rotational speed of an oil pump corresponding to the detected temperature of the oil and the temperature of the drive motor; when the identified target rotational speed is less than a limit rotational speed, controlling an operation of the oil pump based on the identified target rotational speed; and when the identified target rotational speed is greater than or equal to a limit rotational speed, adjusting the identified target rotational speed based on a temperature gradient of the drive motor in a current period and a temperature gradient of the drive motor in a previous period and controlling the operation of the oil pump based on the adjusted target rotational speed.

20 Claims, 8 Drawing Sheets

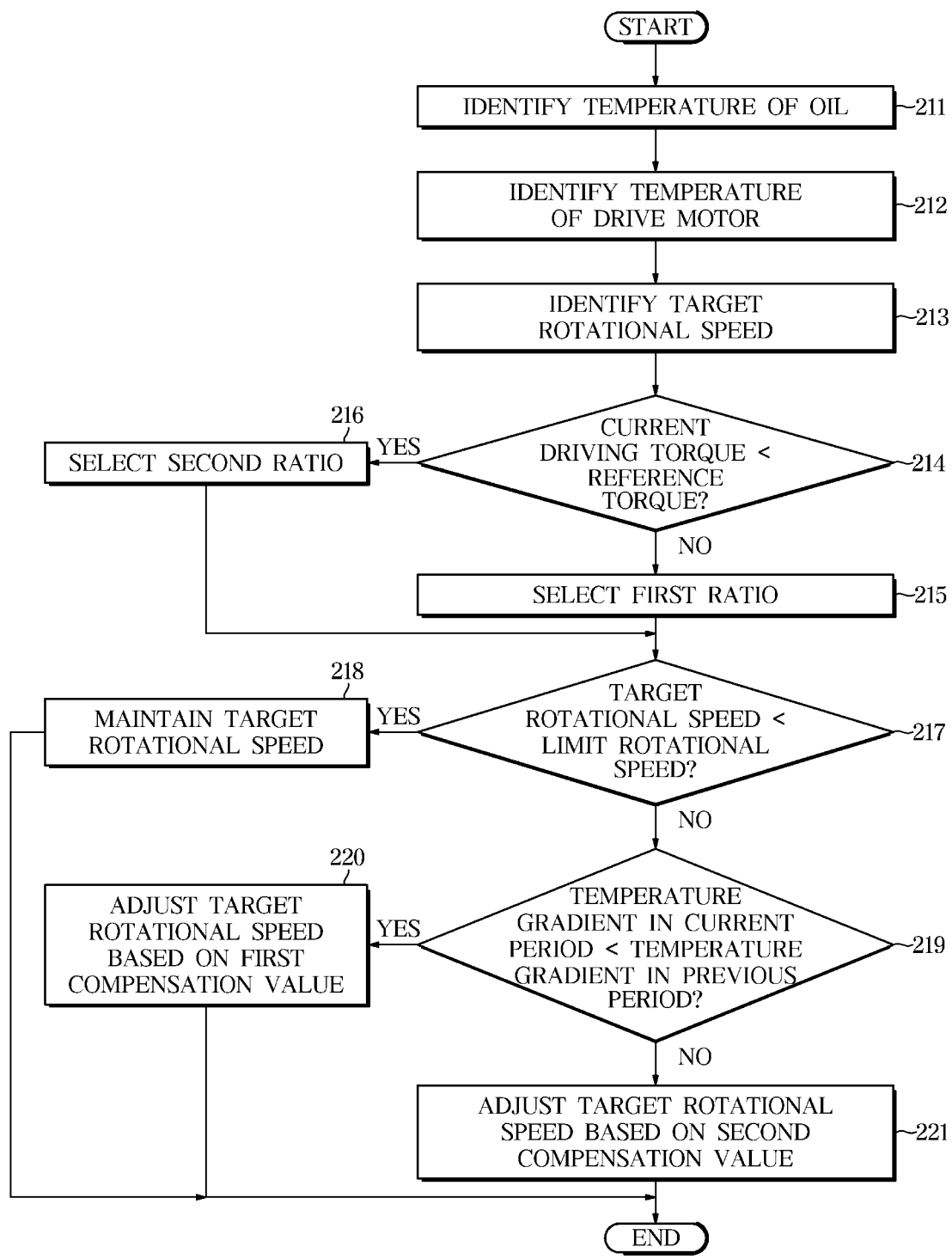

OIL PUMP AND VEHICLE HAVING THE SAME, AND METHOD OF CONTROLLING VEHICLE

CROSS-REFERENCE TO RELATED APPLICATION(S)

This application claims under 35 U.S.C. § 119 the benefit of Korean Patent Application No. 10-2020-0039724, filed on Apr. 1, 2020, the entire contents of which are incorporated by reference herein.

BACKGROUND

(a) Technical Field

The disclosure relates to an oil pump for efficiently cooling a drive motor, a vehicle having the same, and a method of controlling the vehicle, more particularly, to the oil pump that adjusts a rotational speed of the oil pump based on a temperature gradient of a motor when a target rotational speed of the oil pump is greater than or equal to a limit rotational speed.

(b) Description of the Related Art

Vehicles that drive on roads are equipped with various devices for protecting occupants, assisting in driving, and improving ride comfort.

Examples of vehicles include motor vehicles (internal combustion engine-driven cars) driven with mechanical power produced by burning fuel oil, such as gasoline and diesel, and eco-friendly vehicles driven by electrical power so as to reduce the amount of harmful fuel emissions and increase fuel efficiency.

Eco-friendly vehicles include electric vehicles having a rechargeable power supply including a battery and a drive motor, in which the drive motor is rotated with electricity charged in the battery, and wheels are driven using the rotation of the drive motor. Other types of eco-friendly vehicles include hybrid vehicles having an engine, a battery, and a drive motor, and driven by controlling the mechanical power of the engine and the electrical power of the drive motor, and hydrogen fuel cell vehicles.

Electric vehicles have oil pumps for cooling the drive motor, which is driven by a temperature of the drive motor.

Oil pumps increase an injection speed of oil so that more oil is injected as the temperature of the drive motor increases.

When the injection speed of oil is increased in response to an increase in the temperature of the drive motor, if the injection speed of the oil increases above a certain speed, there is a problem that the injected oil does not flow into a coil of the drive motor after the oil touches the coil of the drive motor, but rather flows down along a shape of the coil or bounces from the coil and scatters to the outside of the drive motor.

In this way, when the injection speed of oil is increased in response to an increase in the temperature of the drive motor, even though a large amount of oil is injected, most of the injected oil is not used for cooling the drive motor, thereby reducing the cooling performance of the drive motor.

SUMMARY

An aspect of the disclosure is to provide an oil pump that adjusts a rotational speed of the oil pump based on a temperature gradient of a motor when a target rotational speed of the oil pump is greater than or equal to a limit rotational speed, a vehicle having the same, and a method of controlling the vehicle.

Another aspect of the disclosure is to provide an oil pump that obtains the limited rotational speed corresponding to a drive torque of the drive motor, and adjusts the rotational speed of the oil pump based on the temperature gradient of the motor when the rotational speed of the oil pump is greater than or equal the obtained limit rotational speed, a vehicle having the same, and a method of controlling the vehicle.

Additional aspects of the disclosure will be set forth in part in the description which follows and, in part, will be obvious from the description, or may be learned by practice of the disclosure.

In accordance with an aspect of the disclosure, a vehicle may include a drive motor connected to wheels, the drive motor configured to apply a driving power to the wheels; an oil pump configured to cool the drive motor by supplying oil to the drive motor; a first temperature detector configured to detect a temperature of oil; a second temperature detector configured to detect a temperature of the drive motor; and a controller configured to identify a target rotational speed of the oil pump corresponding to the detected temperature of the oil and the temperature of the drive motor, to adjust the identified target rotational speed based on a temperature gradient of the drive motor in a current period and a temperature gradient of the drive motor in a previous period when the identified target rotational speed is greater than or equal to a limit rotational speed, and to control an operation of the oil pump based on the adjusted target rotational speed.

The vehicle may further include a storage configured to store information about the target rotational speed matched in response to the detected temperature of the oil and the temperature of the drive motor as a reference map. The controller may be configured to identify the target rotational speed through the reference map when the identified target rotational speed is less than the limit rotational speed.

When the temperature gradient of the drive motor in the current period is less than the temperature gradient of the drive motor in the previous period, the controller may be configured to adjust the identified target rotational speed based on a first compensation value.

The controller may be configured to adjust the identified target rotational speed by adding the identified target rotational speed and the first compensation value.

When the temperature gradient of the drive motor in the current period is greater than or equal to the temperature gradient of the drive motor in the previous period, the controller may be configured to adjust the identified target rotational speed based on a second compensation value.

The controller may be configured to adjust the identified target rotational speed by subtracting the second compensation value from the identified target rotational speed.

The vehicle may further include a power converter connected to a battery, the power converter configured to convert electric power charged in the battery into power for driving the drive motor and the oil pump.

The vehicle may further include a cooling water receptor configured to supply cooling water; and a heat exchanger disposed adjacent to an oil passage connected to the oil pump and disposed in a cooling water passage of the cooling water receptor, the cooling water receptor configured to perform heat exchange between the oil and the cooling water.

The vehicle may further include a filter provided between the drive motor and the oil pump, the filter configured to remove impurities of the oil delivered to the oil pump.

The vehicle may further include a current detector configured to detect a current flowing through the drive motor, and a speed detector configured to detect a rotational speed of the drive motor. The controller may be configured to obtain a driving torque of the drive motor based on the detected current of the drive motor and the detected rotational speed of the drive motor, to set a limit rotational speed based on a first ratio when the obtained driving torque is greater than or equal to a reference torque, and to set the limit rotational speed based on a second ratio when the obtained driving torque is less than the reference torque.

In accordance with another aspect of the disclosure, an oil pump may include a driver connected through communication with a controller provided in a vehicle, the driver configured to receive power for driving from a power converter provided in the vehicle; a pump motor configured to operate by a control command of the driver; and a temperature detector configured to detect a temperature of oil. The driver may be configured to identify a target rotational speed of the oil pump corresponding to the detected temperature of the oil and the received temperature of the drive motor when a temperature of a drive motor is received, to adjust the identified target rotational speed based on a temperature gradient of the drive motor in a current period and a temperature gradient of the drive motor in a previous period when the identified target rotational speed is greater than or equal to a limit rotational speed, and to control an operation of the pump motor based on the adjusted target rotational speed.

The oil pump may further include a storage configured to store information about the target rotational speed matched in response to the detected temperature of the oil and the temperature of the drive motor as a reference map. The controller may be configured to identify the target rotational speed through the reference map when the identified target rotational speed is less than the limit rotational speed.

The controller may be configured to adjust the identified target rotational speed based on a first compensation value when the temperature gradient of the drive motor in the current period is less than the temperature gradient of the drive motor in the previous period; and to adjust the identified target rotational speed based on a second compensation value when the temperature gradient of the drive motor in the current period is greater than or equal to the temperature gradient of the drive motor in the previous period.

The controller may be configured to adjust the identified target rotational speed by adding the identified target rotational speed and the first compensation value; and to adjust the identified target rotational speed by subtracting the second compensation value from the identified target rotational speed.

The oil pump may further include a filter configured to remove impurities of the oil delivered from the drive motor to the oil pump.

In accordance with another aspect of the disclosure, in a method of controlling a vehicle, the vehicle including a drive motor configured to apply a driving power to wheels, and an oil pump configured to cool the drive motor. The method includes detecting a temperature of oil; detecting a temperature of the drive motor; identifying a target rotational speed of the oil pump corresponding to the detected temperature of the oil and the temperature of the drive motor; when the identified target rotational speed is less than a limit rotational speed, controlling an operation of the oil pump based on the identified target rotational speed; and when the identified target rotational speed is greater than or equal to a limit rotational speed, adjusting the identified target rotational speed based on a temperature gradient of the drive motor in a current period and a temperature gradient of the drive motor in a previous period and controlling the operation of the oil pump based on the adjusted target rotational speed.

The adjusting of the identified target rotational speed may include when the temperature gradient of the drive motor in the current period is less than the temperature gradient of the drive motor in the previous period, adjusting the identified target rotational speed by adding a first compensation value to the identified target rotational speed; and when the temperature gradient of the drive motor in the current period is greater than or equal to the temperature gradient of the drive motor in the previous period, adjusting the identified target rotational speed by subtracting a second compensation value from the identified target rotational speed.

The method may further include detecting a current flowing through the drive motor; detecting a rotational speed of the drive motor; obtaining a driving torque of the drive motor based on the detected current of the drive motor and the detected rotational speed of the drive motor; when the obtained driving torque is greater than or equal to a reference torque, setting a limit rotational speed based on a first ratio; and when the obtained driving torque is less than the reference torque, setting the limit rotational speed based on a second ratio.

The limit rotational speed may be a speed corresponding to a certain ratio of a maximum rotational speed of a pump motor provided in the oil pump.

The method may further include when the identified target rotational speed is less than the limit rotational speed in a state where the temperature gradient of the drive motor in the current period is greater than or equal to the temperature gradient of the drive motor in the previous period, adjusting the identified target rotational speed based on a first compensation value.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 is a control flowchart of a vehicle according to another embodiment of the disclosure.

DETAILED DESCRIPTION

Figure 1:
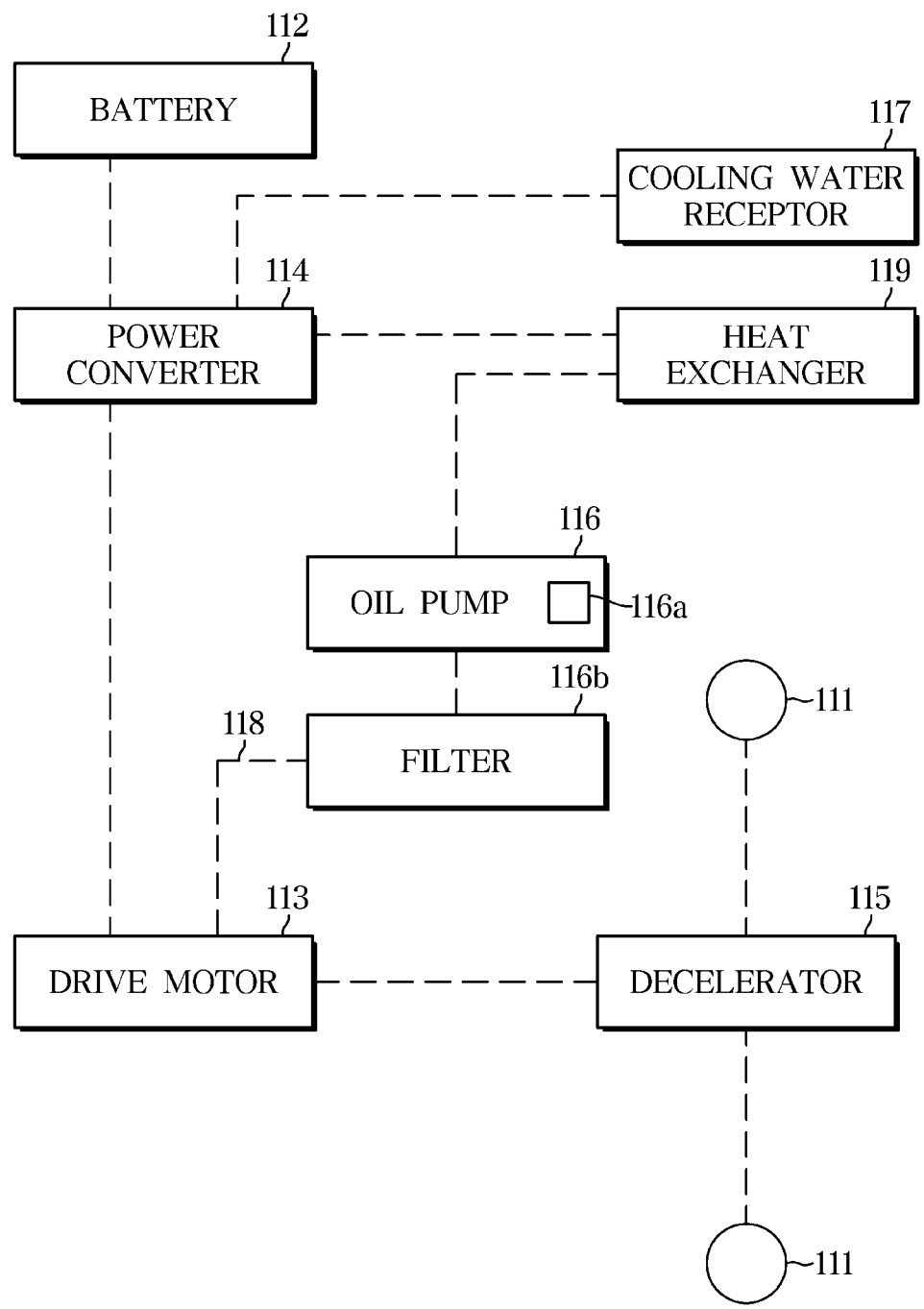
FIG. 1 is a view illustrating a power device of a vehicle according to an embodiment of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN)

It will be further understood that the term "connect" and its derivatives refer both to direct and indirect connection, and the indirect connection includes a connection over a wireless communication network.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

Figure 2:
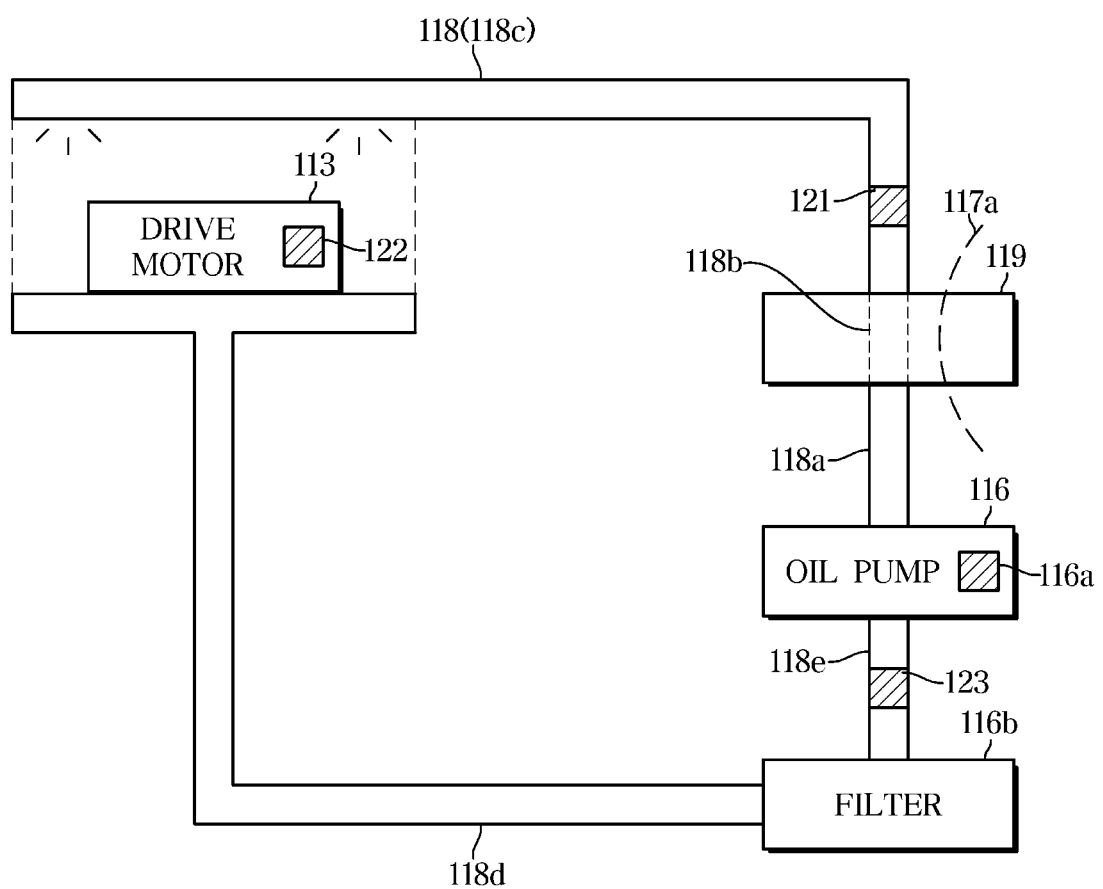
FIG. 2 is a view illustrating a connection structure between an oil pump and a drive motor provided in a vehicle according to an embodiment of the disclosure.

FIG. 1 is an exemplary view illustrating a power system of a vehicle according to an embodiment of the disclosure, and FIG. 2 is an exemplary view illustrating a connection structure between an oil pump and a drive motor provided in a vehicle according to an embodiment of the disclosure.

A vehicle according to an embodiment is a vehicle that receives power from a charger located in a parking lot or charging station, charges a battery using the supplied power, and drives a drive motor using the power charged in the battery to generate driving power, which may include an eco-friendly vehicle.

The embodiment describes an electric vehicle as the eco-friendly vehicle.

A vehicle 100 may include a body with exterior and interior parts, and wheels 111 and a chassis 110, which are other parts of the vehicle 1 except for the body, on which mechanical devices required for driving are installed.

A charging inlet through which a plug provided in an external charger is inserted and connected may be provided on the exterior parts of the body. Here, the charging inlet may include a charging terminal for slow charging and a charging terminal for rapid charging.

The chassis 110 of the vehicle 100 is a frame to support the body, having the wheels 111 equipped at the front and rear and on the left and right of the vehicle 100, power systems for applying a driving power to the wheels 111, a steering system, a brake system for applying a braking force to the wheels 111, and a suspension system.

The power system is a device that generates the driving power necessary for driving the vehicle 100 and adjusts the generated driving power.

As illustrated in FIG. 1, the power system may include a battery 112, a drive motor 113, and a power converter 114, and may further include a decelerator 115.

The battery 112 may perform charging by receiving power from an external power source through the plug inserted into the charging inlet in a charging mode, and charging using a current caused by a back electromotive force generated from the drive motor 113 in a regenerative braking mode, and supply the charged power to the drive motor 113. Here, the external power source may be the charger disposed in the parking lot or the charging station.

The vehicle 100 may include a first battery that supplies the driving power with high-voltage current to the power system including the drive motor 113 and an oil pump 116, and a second battery that supplies the driving power to electronic devices such as convenience devices and additional devices. The convenience device may include an audio device, an indoor lamp, and audio/video/navigation (AVN).

The drive motor 113 may generate the driving power for rotating the wheels 111 and transmit the generated driving power to the decelerator 115.

The drive motor 113 may perform the regenerative braking mode under conditions of energy regeneration by braking, deceleration or low-speed driving, thereby operating as a generator by a turning force (also called rotation power) transmitted through the wheels 111 so that the battery 112 is charged.

When an operation mode of the vehicle 100 is in the charging mode, the drive motor 113 may operates as a transformer and transform when power from the external power source is applied, and then apply the transformed power to the battery 112 so that the battery 112 is charged.

The drive motor 113 may include a circular stator and a rotor disposed on an outer circumference of the stator, and may further include a housing accommodating the stator and the rotor.

The stator of the drive motor 113 may include an annular base, a plurality of teeth disposed along an outer circumference of the base and protruding outward with respect to a radial direction of the stator, and a coil wound around each of the plurality of teeth. The coil may generate a magnetic field by the current flowing through the coil, and the plurality of teeth may be magnetized by the generated magnetic field.

The rotor of the drive motor 113 may include a plurality of permanent magnets disposed on an inner surface of a side wall, which permanent magnets magnetically interact with the coil of the stator. This allows the rotor to rotate. A structure of the drive motor is only an example, and the structure of the drive motor is not limited thereto.

The power converter 114 may convert the power of the external power source into charging power required for charging the battery 112, convert the power of the battery 112 into the driving power required for driving the drive motor 113, and convert the power of the battery 112 into the driving power required for driving the oil pump 116.

The power converter 114 may convert the power of the battery 112 into the driving power of various devices in the vehicle 100.

The decelerator 115 may convert a revolutions per minute (RPM or rotational speed) of the drive motor 113 so that a driving speed of the vehicle 100 reaches a target driving speed. That is, the decelerator 115 may generate the driving power corresponding to the RPM of the converted drive motor 113 and transmit the generated driving power to the left and right wheels 111, respectively.

The decelerator 115 may convert the input RPM of the drive motor 113 into a certain ratio.

The target driving speed may be a speed corresponding to pressurization of an accelerator pedal or a brake pedal, and may be a set driving speed input by a user.

The oil pump 116 preferably is an electric oil pump and may include a pump motor 116a and a driver (a second driver in FIG. 3) for driving the pump motor 116a.

The oil pump 116 may pump oil and inject the oil to the drive motor 113 so that a temperature of the drive motor 113 is adjusted. The oil pump 116 may pump the oil and supply the oil to the decelerator 115 to enable maintenance and lubrication of a hydraulic pressure.

The oil pump 116 may be operated continuously from a time the vehicle 100 is started to the time the vehicle 100 is turned off, and may also be operated in the charging mode of the battery 113.

The vehicle 100 may further include a reservoir that stores the oil and is connected to the drive motor 113, a filter 116b disposed between the reservoir and the oil pump 116 to remove impurities of oil flowing from the reservoir to the oil pump 116, and a cooling water receptor 117 that receives cooling water and lowers a temperature of the oil using the supplied cooling water.

The vehicle 100 may include an oil passage 118 for transmitting the oil pumped by the oil pump 116 to the drive motor 113 and a heat exchanger 119 for lowering the temperature of the oil.

The oil pumped by the oil pump 116 may flow through the drive motor 113 through the oil passage 118. The oil pumped by the oil pump 116 may also flow through the decelerator 115 through the oil passage 118.

As illustrated in FIG. 2, the oil passage 118 may include a first passage 118a for supplying the oil, a second passage 118b connected to the first passage 118a and passing through the heat exchanger 119, a third passage 118c connected to the second passage 118b and injecting the oil toward the drive motor 113, a fourth passage 118d for collecting the injected oil and delivering the collected oil to the filter 116b, and a fifth passage 118e connected to the fourth passage 118d and delivering the oil to the oil pump 116.

The cooling water receptor 117 may include a cooling water passage 117a disposed adjacent to the first passage 118a among the oil passages 118 and flowing the cooling water. The cooling water passage 117a may be connected to the heat exchanger 119. In addition, the cooling water passage 117a may be a part of the heat exchanger 119.

In addition, the reservoir, the drive motor 113, and some of the third passage 118c may be accommodated together in one case.

Figure 3:
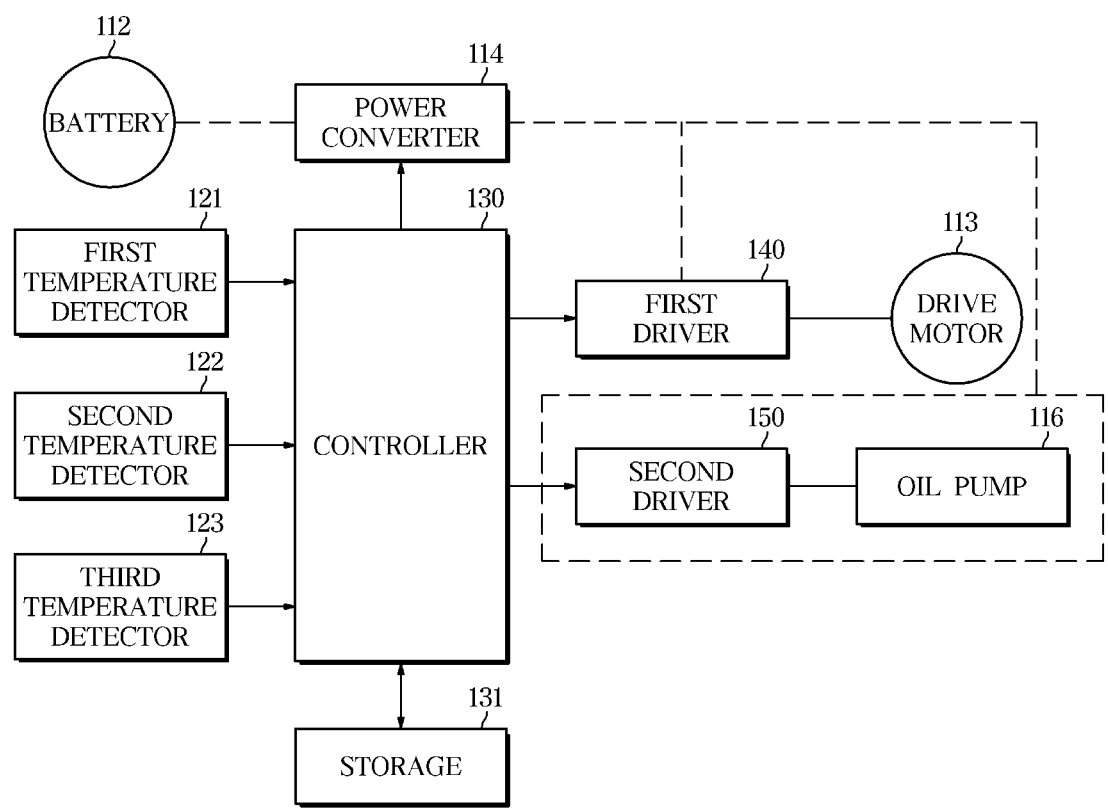
FIG. 3 is a control block diagram of a vehicle according to an embodiment of the disclosure.

The cooling water receptor 117 may block the flow of the cooling water through the heat exchanger 119 when the temperature of the oil is less than a reference temperature in response to a control command from a controller 130 (see FIG. 3).

The heat exchanger 119 may control the temperature of the oil flowing in the third passage 118c using the cooling water flowing through the cooling water passage 117a of the cooling water receptor 117. At this time, the temperature of the oil flowing in the third passage 118c may be maintained at a constant temperature.

The vehicle 100 may include a first temperature detector 121 provided in the third passage 118c to detect the temperature of the oil flowing in the third passage 118c, and a second temperature detector 122 provided in the drive motor 113 to detect the temperature of the drive motor 113, and may further include a third temperature detector 123 provided in the fifth passage 118e to detect the temperature of the oil flowing in the fifth passage 118e.

FIG. 3 is a control block diagram of a vehicle according to an embodiment of the disclosure.

The vehicle 100 may include the battery 112, the drive motor 113, the power converter 114, the oil pump 116, the first temperature detector 121, the second temperature detector 122, the controller 130, a storage 131, a first driver 150, and a second driver 160.

The battery 112, the drive motor 113, the power converter 114, the oil pump 116, the first temperature detector 121, and the second temperature detector 122 has been described in FIGS. 1 and 2, and a detailed description in FIG. 2 will be omitted.

The vehicle 100 may further include a speed detector for detecting the driving speed, a first current detector for detecting a current flowing through the drive motor 113, a second current detector for detecting a current flowing through the pump motor 116, and a rotational speed detector for detecting the rotational speed of the drive motor 113, a first pressure detector for detecting a pressure applied to the accelerator pedal, and a second pressure detector for detecting a pressure applied to the brake pedal.

The controller 130 may obtain the user's requested power based on at least one of the current driving speed of the vehicle 100, pressure information applied to the accelerator pedal, and pressure information applied to the brake pedal, obtain the corresponding to the obtained user's required power, obtain a target rotational speed (that is, a first target rotational speed) of the drive motor 113 corresponding to the obtained target driving speed, and control the operation of the drive motor 113 based on the detected current of the drive motor 113 and the obtained first target rotational speed.

When controlling the operation of the drive motor 113, the controller 130 may cause the drive motor 113 and a first inverter to be electrically and mechanically connected to each other so that the power converted by the first inverter is applied to the coil provided in the drive motor 113.

Through this, the controller 130 may allow the vehicle 100 to drive by the power generated from the drive motor 113.

Here, a period in which the vehicle 100 is driving may be a period between a time point immediately before the start-up is turned off after a time point when the start-up is turned on.

In addition, the controller 130 may control the cooling of the drive motor 113 while charging the battery 112 in the vehicle 100.

The controller 130 may identify the temperature of the oil detected by the first temperature detector 121 during driving, determine whether the identified temperature of the oil is below the reference temperature. When it is determined that the temperature of the oil is below the reference temperature, the controller 130 may stop and control the operation of the cooling water receptor 117. When it is determined that the identified temperature of the oil exceeds the reference temperature, the controller 130 may control the operation of the cooling water receptor 117. Through this, the temperature of the oil delivered from the oil pump 116 to the drive motor 113 may be kept constant.

The controller 130 may periodically obtain a temperature gradient of the drive motor 113 based on the temperature of the drive motor 113 detected by the second temperature detector 122 while driving and periodically store the obtained temperature gradient. Here, the period may be approximately 0.5 ms.

The controller 130 may compare the temperature gradient obtained in a current period (i.e., a current temperature gradient) and the temperature gradient obtained in a previous period (i.e., a previous temperature gradient) while driving. When the current temperature gradient is less than the previous temperature gradient, the controller 130 may control the operation of the pump motor 116a of the oil pump 116 based on the target rotational speed identified through a reference map. When the current temperature gradient is greater than or equal to the previous temperature gradient, the controller 130 may compare the identified target rotational speed with the limit rotational speed. When the identified target rotational speed is less than the limit rotational speed in a state where the current temperature gradient is greater than or equal to the previous temperature gradient, the controller 130 may adjust the target rotational speed based on a first compensation value. When the identified target rotational speed is greater than or equal to the limit rotational speed in a state where the current temperature gradient is greater than or equal to the previous temperature gradient, the controller 130 may adjust the target rotational speed based on a second compensation value.

The controller 130 may identify the temperature of the drive motor 113 detected by the second temperature detector 122 during driving, and identify the identified temperature of the drive motor 113 and the target rotational speed (that is, the second target rotational speed) of the pump motor 116a corresponding to the identified temperature of the oil through the reference map stored in the storage 131. The controller 130 may supply the oil pumped by the oil pump 116 to the drive motor 113 by controlling the rotational speed of the pump motor 116a based on the identified second target rotational speed. At this time, the temperature of the drive motor 113 may be maintained at the constant temperature by the oil. That is, it is possible to prevent the drive motor 113 from being overheated.

In addition, the oil pumped by the oil pump 116 may be supplied to the decelerator 115.

The target rotational speed of the pump motor 116a in the reference map stored in the storage 131 may increase in proportion to the temperature of the drive motor 113 and the identified temperature of the oil.

The controller 130 may compare the target rotational speed (that is, the second target rotational speed) and the limit rotational speed of the pump motor 116a while driving. When it is determined that the second target rotational speed is less than the limit rotational speed, the controller 130 may maintain the identified second target rotational speed. When it is determined that the second target rotational speed is greater than or equal to the limit rotational speed, the controller 130 may obtain the temperature gradient of the drive motor 113 in the current period. The controller 130 may compare the obtained temperature gradient of the drive motor 113 in the current period (this is referred to as the current temperature gradient) and the obtained temperature gradient of the drive motor 113 in the previous period (this is referred to as the previous temperature gradient), and adjust the second target rotational speed based on the comparison result.

The limit rotational speed may be a speed corresponding to a certain ratio of a maximum rotational speed of the pump motor 116a. Here, the certain ratio may be approximately 0.7. That is, the limit rotational speed (Max RPM*0.7) may be lower than the maximum rotational speed (Max RPM).

When it is determined that the current temperature gradient is less than the previous temperature gradient in a state where the second target rotational speed is greater than or equal to the limit rotational speed, the controller 130 may adjust the second target rotational speed based on the first compensation value. When it is determined that the current temperature gradient is greater than or equal to the previous temperature gradient in a state where the second target rotational speed is greater than or equal to the limit rotational speed, the controller 130 may adjust the second target rotational speed based on the second compensation value. The controller 130 may control the operation of the pump motor 116a of the oil pump 116 based on the maintained or adjusted second target rotational speed.

When adjusting the second target rotational speed based on the first compensation value, the controller 130 may obtain a new second target rotational speed by adding the first compensation value to the second target rotational speed, and adjust the second target rotational speed identified as the new second target rotational speed.

The first compensation value may be the constant value.

The first compensation value may be values matched to the temperature of the drive motor 113 or the temperature gradient of the drive motor 113, and the first compensation values may be provided as a first compensation map. The first compensation values may be values obtained by experiment.

At this time, the target rotational speed of the pump motor 116a of the oil pump 116 may be increased.

When adjusting the second target rotational speed based on the first compensation value, the controller 130 may obtain the new second target rotational speed by subtracting the second compensation value to the second target rotational speed, and adjust the rotational speed of the pump motor 116a as the new second target rotational speed. At this time, the target rotational speed of the pump motor 116a of the oil pump 116 may be decreased.

The second compensation value may be the constant value.

The second compensation value may be values matched to the temperature of the drive motor 113 or the temperature gradient of the drive motor 113, and the second compensation values may be provided as the first compensation map. The second compensation values may be values obtained by experiment.

The controller 130 may identify the current flowing through the pump motor 116a, obtain an actual rotational speed of the pump motor 116a based on the identified current, and control the operation of pump motor 116a by comparing the obtained actual rotational speed with the second target rotational speed.

The controller 130 may also receive information on the actual rotational speed of the pump motor 116a from the second driver 150. In this case, the controller 130 may receive feedback of the actual rotational speed of the pump motor 116a while driving, and control the driving of the pump motor 116a so that the actual rotational speed of the pump motor 116a is maintained at the determined second target rotational speed based on the actual rotational speed and the determined second target rotational speed.

The determined second target rotational speed may be any one of the maintained second target rotational speed, the second target rotational speed adjusted by the first compensation value, and the second target rotational speed adjusted by the second compensation value.

The controller 130 may directly diagnose a failure of the oil pump 116, and may receive failure information of the oil pump 116 from the second driver 150. At this time, the controller 130 may display the failure information of the oil pump 116 through a display provided on the vehicle 100, or store failure information of the oil pump in the storage 131, store failure information of the oil pump 116 in the storage 131, and transmit the stored failure information of the oil pump 116 to a diagnostics during vehicle inspection.

When the temperature of the oil is greater than or equal to the reference temperature, the controller 130 may control the operation of the cooling water receptor 117 so that the temperature of the oil decreases.

In addition, the cooling water receptor 117 may further include a fan for performing heat exchange between the oil flowing in the oil passage 118 and the cooling water flowing in the cooling water passage 117a, and a valve for blocking the flow of the cooling water. When controlling the operation of the cooling water receptor 117, the controller 130 may control the closing of the valve to block the flow of cooling water, control the opening of the valve so that the cooling water flows through the cooling water passage 117a, and control the fan so that the heat exchange occurs between the cooling water and the oil.

The controller 130 according to an embodiment may be implemented with the memory storing an algorithm to control operation of the components in the vehicle 100 or data about a program that implements the algorithm, and the processor carrying out the aforementioned operation using the data stored in the memory. The memory and the processor may be implemented in separate chips. Alternatively, the memory and the processor may be implemented in a single chip.

The controller 130 may be an electronic control unit (ECU) that controls the driving of the vehicle 100, and may be any one of a microcomputer, a CPU, and the processor.

The controller 130 according to an embodiment may include a drive motor controller (MCU: Motor Control Unit) that controls the operation of the first inverter to rotate the drive motor 113 and performs regenerative braking during braking or deceleration, and a pump controller (PCU: Pump Control Unit) that controls driving of the pump motor 116a provided in the oil pump 116.

The controller 130 provided in the vehicle 100 according to another embodiment may change the limit rotational speed based on a driving torque of the drive motor 113, and control the second target rotational speed of the pump motor 116a of the oil pump based on the comparison result of the changed limit rotational speed and the second target rotational speed, the temperature gradient of the drive motor 113 of the current period, and the temperature gradient of the drive motor 113 of the previous period.

That is, the controller 130 of the vehicle 100 according to another embodiment may obtain the driving torque of the drive motor 113 based on the rotational speed (that is, also referred to as the RPM) of the drive motor 113, compare the obtained driving torque and a reference torque, select a first ratio when the obtained driving torque is less than the reference torque, and select a second ratio when the obtained driving torque is more than the reference torque. The controller 130 may obtain the limit rotational speed based on the maximum rotational speed and the selected constant ratio. When the obtained second target rotational speed is less than the limit rotational speed, the controller 130 may maintain the second target rotational speed of the pump motor 116a as the second target rotational speed obtained by the reference map.

The controller 130 of the vehicle 100 according to another embodiment may obtain the driving torque based on the number of rotor poles of a drive motor 113, a magnetic flux of the permanent magnet, an inductance of the coil, the rotational speed of the rotor, and a q-axis current.

When the second target rotational speed is greater than or equal to the limit rotational speed, the controller 130 of the vehicle 100 according to another embodiment may adjust the second target rotational speed of the pump motor 116a of the oil pump 116 based on the temperature gradient of the drive motor 113 of the current period and the temperature gradient of the drive motor 113 of the previous period, but the controller 130 may adjust the second target rotational speed of the pump motor 116a based on the first compensation value or the second compensation value.

The controller 130 according to another embodiment may be implemented with the memory storing the algorithm to control operation of the components in the vehicle 100 or the data about the program that implements the algorithm, and the processor carrying out the aforementioned operation using the data stored in the memory. The memory and the processor may be implemented in separate chips. Alternatively, the memory and the processor may be implemented in the single chip.

The storage 131 may stores the reference map in which the target rotational speed is matched corresponding to the temperature of the oil and the temperature of the drive motor 113, and store the first compensation value and the second compensation value.

Here, the temperature of the drive motor 113 and the target rotational speed of the pump motor 116a of the oil pump 116 corresponding to the temperature of the oil may be stored as a lookup table.

The storage 131 may also store the first compensation map and the second compensation map.

The storage 131 may also store information about the certain ratio for obtaining the limit rotational speed.

The storage 131 may periodically store the temperature gradient of the drive motor 113 in response to the control command from the controller 130.

The storage 131 may store the reference temperature for controlling cooling of the oil.

The storage 131 may store information about the target rotational speed of the pump motor 116a corresponding to a target flow rate.

The storage 131 may be a memory implemented with a chip separate from the aforementioned processor in relation to the controller 130, or may be implemented integrally with the processor in a single chip.

The storage 131 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto.

The first driver 140 may drive the drive motor 113 in response to the control command from the controller 130. The first driver 140 may include the first inverter, and may further include a rectifier.

The rectifier may include a full bridge circuit and an LC filter, and the full bridge circuit may include a plurality of switch elements.

The rectifier may rectify a high voltage alternating current (AC) power using a full bridge circuit and convert the AC power to direct current (DC) voltage using the LC filter.

The first inverter may convert the DC voltage into a three-phase AC voltage in response to the charging voltage received from the battery 112 and apply the converted three-phase AC voltage to the drive motor 113. That is, when the driving power of the drive motor 113 is output, the first inverter may output the driving power of the drive motor 113 corresponding to the target rotational speed according to the control command of the controller 130. Here, the driving power of the drive motor 113 may be a switching signal for outputting the current corresponding to the target rotational speed and a switching signal for outputting the voltage corresponding to the target rotational speed.

The first inverter may include the plurality of switch elements, and may further include diodes each connected to the plurality of switch elements.

The second driver 150 may drive the pump motor 116a of the oil pump 116 in response to the control command from the controller 130. The second driver 150 may include a second inverter, and may further include the rectifier.

The rectifier may include the full bridge circuit and the LC filter, and the full bridge circuit may include the plurality of switch elements. The rectifier may rectify the high voltage AC power using the full bridge circuit and convert the AC power to DC voltage using the LC filter. The second inverter may convert the DC voltage into the three-phase AC voltage in response to the charging voltage received from the battery 112 and apply the converted three-phase AC voltage to the pump motor 116a.

That is, when the driving power of the pump motor 116a is output, the second inverter may output the driving power of the pump motor 116a corresponding to the target rotational speed according to the control command of the controller 130. Here, the driving power of the pump motor 116a may be the switching signal for outputting the current corresponding to the target rotational speed and the switching signal for outputting the voltage corresponding to the target rotational speed.

The second inverter may include the plurality of switch elements, and may further include diodes each connected to the plurality of switch elements.

The second driver 150 may function as the controller 130 for controlling the operation of the pump motor 116a of the oil pump 116.

That is, the second driver 150 may be connected through communication with the controller 130 of the vehicle 100, and when the temperature of the drive motor 113 is received from the controller 130 of the vehicle 100, the second driver may identify the detected temperature of the oil and the target rotational of the oil pump 116 corresponding to the temperature of the drive motor 113. When the identified target rotational speed is more than the limit rotational speed, the second driver may adjust the identified target rotational speed based on the temperature gradient of the drive motor 113 in the current period and the temperature gradient of the drive motor 113 in the previous period, and control the operation of the oil pump 116 based on the adjusted target rotational speed.

The second driver 150 may be provided in the oil pump 116 and may transmit and receive various types of information by performing communication with the controller 130.

The second driver 150 may diagnose the failure of the oil pump 116, diagnose the failure of the pump motor 116a, and transmit diagnostic information to the controller 130.

The second driver 150 may obtain the actual rotational speed of the pump motor 116a based on current information obtained by the current detector connected to the pump motor 116a, and transmit information about the obtained actual rotational speed of the pump motor 116a to the controller 130.

The second driver 150 may adjust the power applied to the pump motor 116a by performing pulse width modulation of at least one of the input current and voltage based on the rotational speed of the pump motor 116a.

The oil pump 116 may receive the driving power from the power converter 114.

When the pump motor 116a of the oil pump 116 is driven, the oil stored in the reservoir may flow through the oil passage 118 to the drive motor 113. At this time, the oil flowing into the drive motor 113 flows into the reservoir after being injected.

Figure 4:
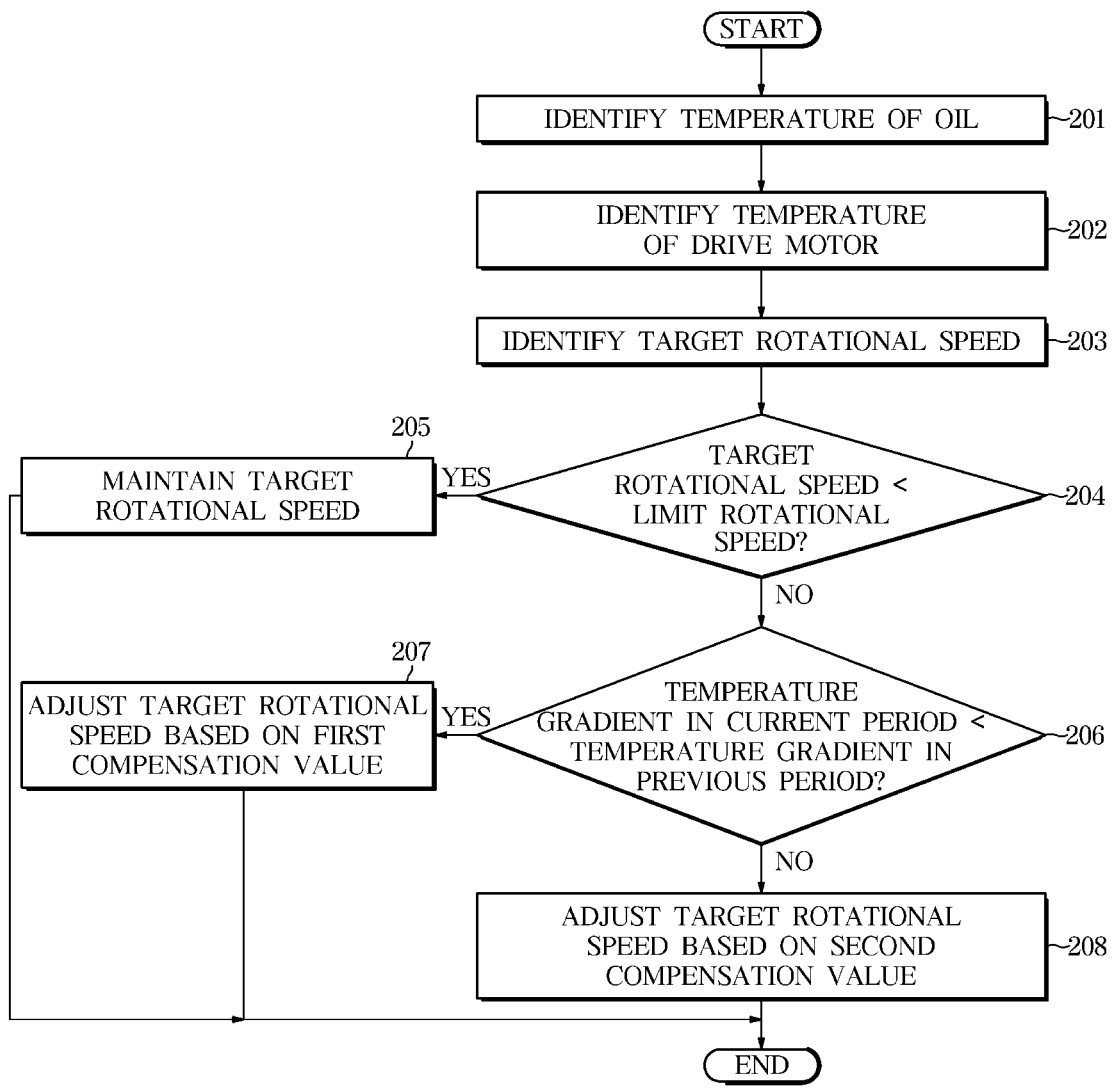
FIG. 4 is a control flowchart of a vehicle control according to an embodiment of the disclosure.

FIG. 4 is a control flowchart of a vehicle control according to an embodiment of the disclosure.

The vehicle 100 may identify the temperature of the oil while driving (step 201).

Here, the temperature of the oil may be the temperature of the oil flowing in the third passage 118c detected by the first temperature detector 121, or the temperature of the oil flowing in the fifth passage 118e detected by the third temperature detector 123.

The temperature of the oil flowing in the third passage 118c may be the temperature of the oil passed through the heat exchanger 119. The temperature of the oil flowing through the fifth passage 118e may be the temperature of the oil passed through the filter.

The vehicle 100 may identify the temperature of the drive motor 113 detected by the second temperature detector 121 (step 202).

The vehicle 100 may identify the identified temperature of the oil through the reference map stored in the storage 131 and the target rotational speed corresponding to the identified temperature of the drive motor 113 (step 203), obtain the temperature gradient of the drive motor 113 in the current period, and store the obtained temperature gradient.

The vehicle 100 may periodically obtain the temperature gradient of the drive motor 113 based on the temperature of the drive motor 113 detected by the second temperature detector 122, and periodically store the obtained temperature gradient of the drive motor 113.

The vehicle 100 may obtain and store the temperature gradient of the drive motor 113 at intervals of approximately 0.5 ms.

The vehicle 100 may compare the target rotational speed and the limit rotational speed of the pump motor 116a.

At this time, when the vehicle 100 determines that the target rotational speed is less than the limit rotational speed (step 204), the vehicle 100 may control the operation of the pump motor 116a so that the target rotational speed of the pump motor 116a is maintained at the identified target rotational speed (step 205). At this time, the identified target rotational speed may increase as at least one of the temperature of the drive motor 113 and the temperature of the oil increases.

The limit rotational speed may be the speed corresponding to the certain ratio of the maximum rotational speed of the pump motor 116a. The certain ratio may be approximately 0.7. That is, the limit rotational speed (Max RPM*0.7) may be lower than the maximum rotational speed (Max RPM).

When it is determined that the target rotational speed of the pump motor 116a is more than the limit rotational speed, the vehicle 100 may obtain the temperature gradient of the pump motor 116a in the current period and identify the temperature gradient of the pump motor 116a in the previous period stored in the storage 131. The vehicle 100 may compare the temperature gradient of the pump motor 116a of the obtained current period (this is called the current temperature gradient) and the temperature gradient of the pump motor 116a of the previous period (this is called the previous temperature gradient).

When it is determined that the current temperature gradient is less than the previous temperature gradient (step 206), the vehicle 100 may adjust the identified target rotational speed based on the first compensation value (step 207), and operate the pump motor 116a of the oil pump 116 based on the adjusted target rotational speed. Here, the first compensation value may be the constant value. That is, the vehicle 100 may obtain the new target rotational speed by adding the first compensation value and the identified target rotational speed.

At this time, the amount of oil injected may be greater than the amount of oil corresponding to the identified target rotational speed.

As the injection amount of the oil increases as described above, a contact area of the drive motor 113 to which the oil contacts is increased, thereby increasing the cooling efficiency of the drive motor 113.

In addition, when it is determined that the target rotational speed is less than the limit rotational speed, the vehicle 100 may identify the first compensation value through the first compensation map and adjust the identified target rotational speed by adding the first compensation value identified in the target rotational speed, and operate the pump motor 116a of the oil pump 116 based on the adjusted target rotational speed, so that the oil having the target flow rate corresponding to the adjusted target rotational speed can be injected.

Here, the first compensation value may be a value corresponding to the temperature of the pump motor 116a or the temperature gradient of the pump 116a motor in the current period, and may be a compensation rotational speed.

On the other hand, when it is determined that the current temperature gradient is greater than or equal to the previous temperature gradient, the vehicle 100 may adjust the identified target rotational speed based on the second compensation value (step 208), and operate the pump motor 116a of the oil pump 116 based on the adjusted target rotational speed. Here, the second compensation value may be the constant value.

That is, the vehicle 100 may obtain the new second target rotational speed by subtracting the second compensation value from the identified target rotational speed, and operate the pump motor 116a so that the target rotational speed of the pump motor 116a is maintained at the new target rotational speed.

At this time, the new target rotational speed may be lower than the identified target rotational speed. For this reason, the amount of oil injected from the oil pump 116 may be less than the amount of the oil corresponding to the identified target rotational speed.

That is, when the temperature gradient of the pump motor 116a increases, the target flow rate may be decreased by decreasing the target rotational speed of the pump motor 116a, thereby preventing the oil scattering from the drive motor 113. As a result, it is possible to increase the cooling efficiency of the drive motor 113.

In addition, when it is determined that the current temperature gradient is higher than the previous temperature gradient, the vehicle 100 may identify the second compensation value through the second compensation value, adjust the identified target rotational speed by subtracting the identified second compensation value from the identified target rotational speed, and operate the pump motor 116a of the oil pump 116 based on the adjusted target rotational speed, so that the oil having the target flow rate corresponding to the adjusted target rotational speed can be injected.

Here, the second compensation value may be a value corresponding to the temperature of the pump motor 116a or the temperature gradient of the pump motor 116a in the current period, and may be the compensation rotational speed.

The operating the pump motor 116a of the oil pump 116 may include performing pulse width modulation (PWM) of the current or the voltage applied to the pump motor 116a.

In addition, the vehicle 100 may lower the pumped temperature of the oil by using the cooling water receptor 117. This may include lowering the temperature of the oil by allowing the cooling water to flow into the cooling water receptor 117 and heat exchange between the introduced cooling water and the oil.

In the embodiment, after comparing the target rotational speed and the limit rotational speed, the current temperature gradient and the previous temperature gradient were compared, but it is also possible to adjust the target flow rate by comparing the current temperature gradient and the previous temperature gradient, and then comparing the target rotational speed and the limit rotational speed to adjust the target rotational speed of the pump motor 116a.

In addition, it is possible for the vehicle 100 to compare the current temperature gradient and the previous temperature gradient, then compare the target rotational speed and the limit rotational speed, and compare the current temperature gradient and the previous temperature gradient again.

FIG. 5 is a control flowchart of a vehicle according to another embodiment of the disclosure.

The vehicle 100 may identify the temperature of the oil while driving (step 211), and identify the temperature of the drive motor 113 detected by the second temperature detector 121 (step 212).

Here, the temperature of the oil may be the temperature of the oil flowing in the third passage 118c detected by the first temperature detector 121, or the temperature of the oil flowing in the fifth passage 118e detected by the third temperature detector 123.

The vehicle 100 may periodically obtain the temperature gradient of the drive motor 113 based on the temperature of the drive motor 113 detected by the second temperature detector 122, and periodically store the obtained temperature gradient of the drive motor 113. The vehicle 100 may obtain and store the temperature gradient of the drive motor 113 at intervals of approximately 0.5 ms.

The vehicle 100 may identify the identified temperature of the oil through the reference map stored in the storage 131 and the target rotational speed corresponding to the identified temperature of the drive motor 113 (step 213), obtain the temperature gradient of the drive motor 113 in the current period.

The vehicle 100 may obtain the driving torque of the drive motor 113 based on the target rotational speed of the drive motor 113 and the current of the drive motor 113, and compare the obtained driving torque with a reference torque.

The vehicle 100 may obtain the driving torque of the drive motor 113 based on the actual rotational speed of the drive motor 113 and the current of the drive motor 113.

When the obtained driving torque is less than the reference torque 214, the vehicle 100 may select a first ratio (step 215) and set the limit rotational speed based on the selected first ratio. When the obtained driving torque is more than the reference torque, the vehicle 100 may select a second ratio (step 216) and set the limit rotational speed based on the selected second ratio. Here, the first ratio may be 1 and the second ratio may be 0.8.

That is, when the first ratio is selected, the limit rotational speed may be the maximum rotational speed*1. When the second ratio is selected, the limit rotational speed may be the maximum rotational speed*0.8.

When the driving torque of the drive motor 113 is less than the reference torque, it means that the temperature of the drive motor 113 is below the reference temperature.

The vehicle 100 may compare the target rotational speed and the limit rotational speed of the pump motor 116a.

At this time, when it is determined that the target rotational speed is less than the set limit rotational speed (step 217), the vehicle 100 may control the operation of the pump motor 116a so that the rotational speed of the pump motor 116a is maintained at the identified target rotational speed (step 218).

When it is determined that the target rotational speed of the pump motor 116a is more than the limit rotational speed, the vehicle 100 may obtain the temperature gradient of the pump motor 116a in the current period and identify the temperature gradient of the pump motor 116a in the previous period stored in the storage 131. The vehicle 100 may compare the temperature gradient of the pump motor 116a of the obtained current period (this is called the current temperature gradient) and the temperature gradient of the pump motor 116a of the previous period (this is called the previous temperature gradient).

When it is determined that the current temperature gradient is less than the previous temperature gradient (step 219), the vehicle 100 may adjust the identified target rotational speed based on the first compensation value (step 220), and operate the pump motor 116a of the oil pump 116 based on the adjusted target rotational speed.

Here, the first compensation value may be the constant value. That is, the vehicle 100 may obtain the new target rotational speed by adding the first compensation value and the identified target rotational speed. At this time, the amount of oil injected may be greater than the amount of oil corresponding to the identified target rotational speed. As the injection amount of the oil increases as described above, the contact area of the drive motor 113 to which the oil contacts is increased, thereby increasing the cooling efficiency of the drive motor 113.

In addition, when it is determined that the target rotational speed is less than the limit rotational speed, the vehicle 100 may identify the first compensation value through the first compensation map and adjust the identified target rotational speed by adding the first compensation value identified in the target rotational speed, and operate the pump motor 116a of the oil pump 116 based on the adjusted target rotational speed, so that the oil having the target flow rate corresponding to the adjusted target rotational speed can be injected.

On the other hand, when it is determined that the current temperature gradient is greater than or equal to the previous temperature gradient, the vehicle 100 may adjust the identified target rotational speed based on the second compensation value (step 221), and operate the pump motor 116a of the oil pump 116 based on the adjusted target rotational speed. Here, the second compensation value may be the constant value.

That is, the vehicle 100 may obtain the new second target rotational speed by subtracting the second compensation value from the identified target rotational speed, and operate the pump motor 116a so that the target rotational speed of the pump motor 116a is maintained at the new target rotational speed.

At this time, the new target rotational speed may be lower than the identified target rotational speed. For this reason, the amount of oil injected from the oil pump 116 may be less than the amount of the oil corresponding to the identified target rotational speed.

In addition, when it is determined that the current temperature gradient is higher than the previous temperature gradient, the vehicle 100 may identify the second compensation value through the second compensation value, adjust the identified target rotational speed by subtracting the identified second compensation value from the identified target rotational speed, and operate the pump motor 116a of the oil pump 116 based on the adjusted target rotational speed, so that the oil having the target flow rate corresponding to the adjusted target rotational speed can be injected.

Here, the second compensation value may be a value corresponding to the temperature of the pump motor 116a or the temperature gradient of the pump motor 116a in the current period, and may be the compensation rotational speed.

In another embodiment, the current temperature gradient and the previous temperature gradient were compared after comparing the target rotational speed and the limit rotational speed, but in another embodiment, the target rotational speed and the limit rotational speed were compared after comparing the current temperature gradient and the previous temperature gradient. In comparison, it is also possible to control the target flow rate by adjusting the target rotational speed of the pump motor 116a.

In another embodiment, the vehicle 100 may compare the temperature gradient of the current period with the temperature gradient of the previous period. As a result of the comparison, when the temperature gradient of the current period is less than the temperature gradient of the previous period (that is, when it is determined that the temperature gradient of the drive motor is not large), the vehicle 100 may maintain the rotational speed of the oil pump 116 at the target rotational speed. When the temperature gradient of the current period is greater than the temperature gradient of the previous period (that is, if it is determined that the temperature change of the drive motor is large), the vehicle 100 may identify the target rotational speed corresponding to the temperature of the oil and the drive motor 113, and compare the identified target rotational speed with the limit rotational speed. As a result of the comparison, when the identified target rotational speed is less than the limit rotational speed, the vehicle 100 may adjust the target rotational speed based on the first compensation value. When the target rotational speed is higher than the limit rotational speed, the vehicle 100 may adjust the target rotational speed based on the second compensation value.

Here, adjusting the target rotational speed based on the first compensation value may include increasing the target rotational speed.

The adjusting the target rotational speed based on the second compensation value may include causing the target rotational speed to be reduced.

Figure 6A:
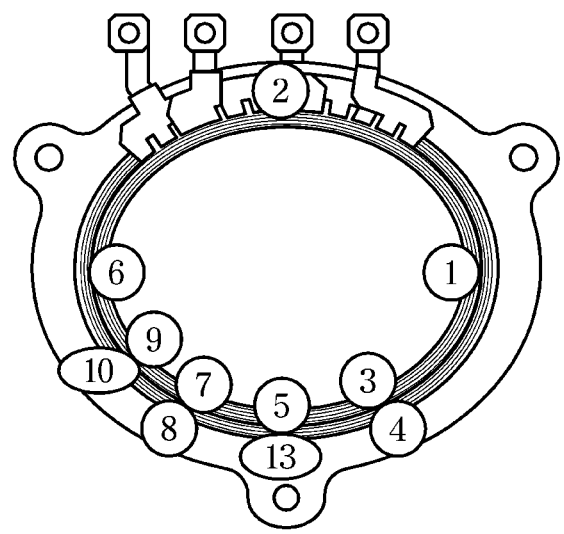
FIG. 6A is a view illustrating a temperature detector provided on a front surface of a drive motor.
Figure 6B:
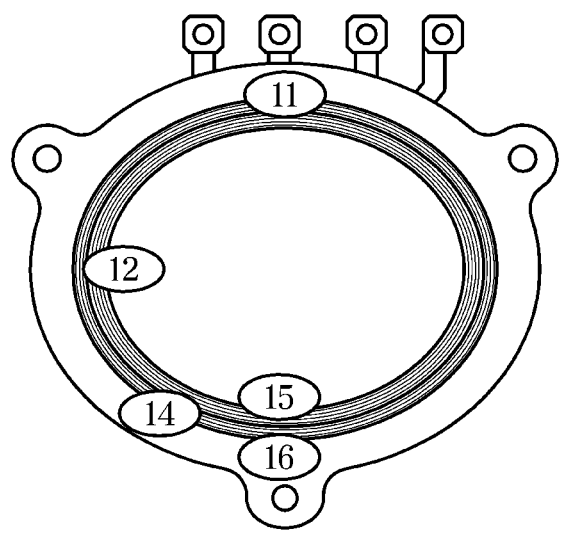
FIG. 6B is a view illustrating a temperature detector provided on a rear surface of a drive motor.

FIG. 6A is a view illustrating a temperature detector provided on a front surface of a drive motor, and FIG. 6B is a view illustrating a temperature detector provided on a rear surface of a drive motor.

Figure 7A:
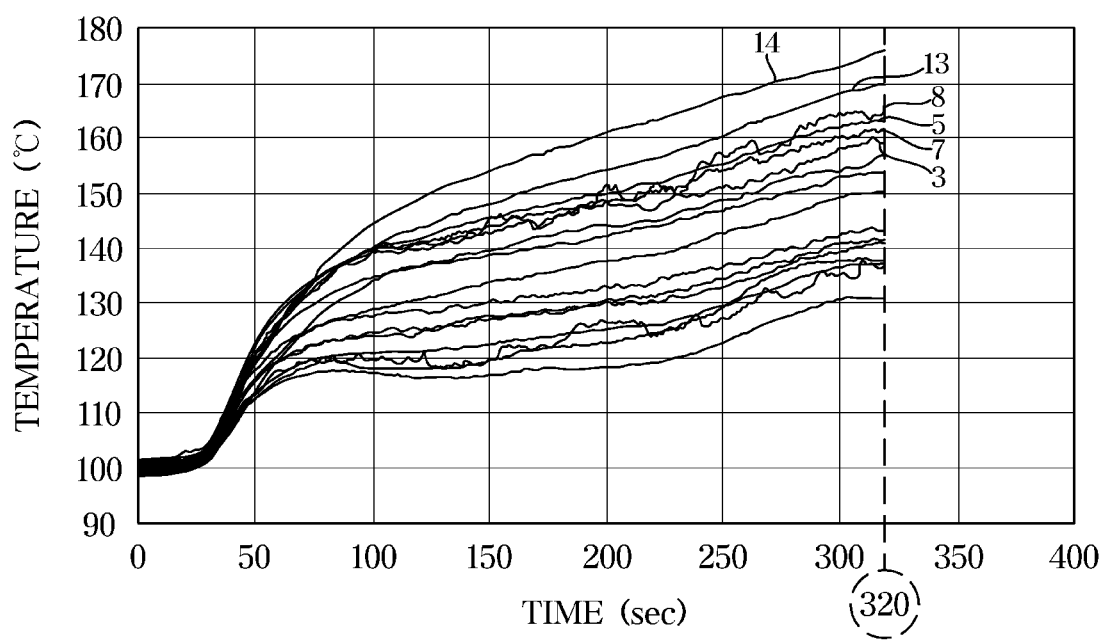
FIG. 7A is a graph of a temperature detected by the temperature detector provided in FIGS. 6A and 6B when oil is injected into a drive motor by a first injection amount.
Figure 7B:
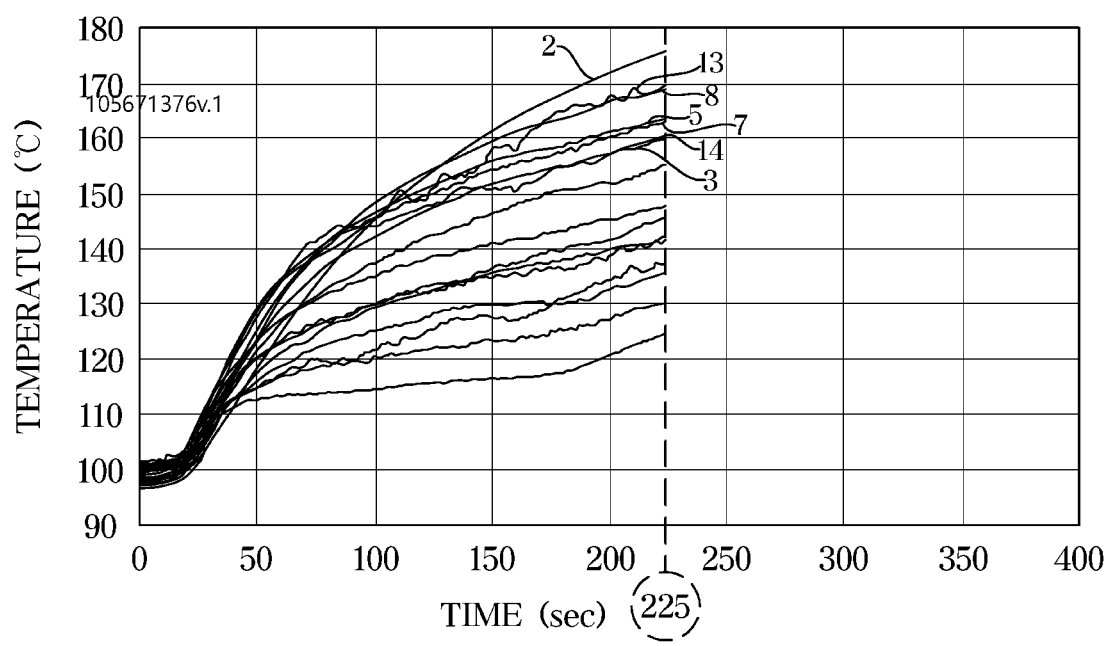
FIG. 7B is a graph of a temperature detected by the temperature detector provided in FIGS. 6A and 6B when oil is injected into a drive motor by a second injection amount.

FIGS. 7A and 7B are graphs of temperatures detected by the temperature detector provided in FIGS. 6A and 6B when the oil corresponding to a first injection amount (8 LPM (Liter per minute)) and a second injection amount (9 LPM) is injected into the drive motor 113.

The vehicle 100 is in a state of driving at a highest constant speed (200 kph), the target rotational speed of the drive motor 113 may be 15800 rpm and the driving torque may be 67 Nm.

By increasing the effective cooling oil that is effectively used for actual cooling, LPM may be saved and oil cooling performance may be improved.

As a result of the test, despite the increase in the amount of oil injected from 8 LPM to 9 LPM, a test available time decreased from 320 [sec] (8 LPM) to 225 [sec] (9 LPM), and the 9 LPM situation illustrated poor cooling performance.

In particular, the temperature at the positions ②, ⑬, ⑧, ⑤, and ⑦ illustrated a rapid increase in temperature at 9 LPM compared to 8 LPM. This is effective for cooling used for actual cooling as the oil does not touch or hit the coil and scatters as the injection amount increases. This is because the amount of effective oil has decreased.

Accordingly, in the disclosure, the injection amount is increased, but the cooling performance is inferior, and it is determined as a decrease in the cooling effective oil amount, thereby reducing the injection amount of oil (e.g., 9 LPM→8 LPM) and improving cooling performance.

The disclosure may reduce a load of the oil pump 116 by preventing the oil pump 116 from unnecessarily rotating at the highest rotational speed, thereby reducing the overall load and improving the electric power consumption.

According to the disclosure, the driving distance may be increased according to the improvement of fuel consumption.

As is apparent from the above description, the disclosure may increase the injection speed of oil in response to an increase in the temperature of the drive motor, but it is possible to efficiently cool the drive motor by adjusting the oil injection speed based on the temperature gradient of the drive motor.

The disclosure may prevent damage of the drive motor by efficient cooling of the drive motor, extend a life of the drive motor, and prevent demagnetization of a permanent magnet of the drive motor, thereby improving the performance of the drive motor.

The disclosure may prevent excessive driving of the oil pump for cooling the drive motor, thereby preventing the failure of the oil pump and extending a life of the oil pump. Accordingly, it is possible to prevent the failure of the vehicle, improve the stability of the vehicle, and improve the fuel consumption of the vehicle.

The disclosure may reduce an overall load by suppressing inefficient overload in the oil pump, thereby increasing a driving distance of the vehicle.

As described above, the disclosure may improve the quality and marketability of oil pumps and eco-friendly vehicles, and further enhance user satisfaction, improve user convenience and vehicle safety, and secure product competitiveness.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A vehicle comprising:
a drive motor connected to wheels, the drive motor configured to apply a driving power to the wheels;
an oil pump configured to cool the drive motor by supplying oil to the drive motor;
a first temperature detector configured to detect a temperature of the oil;
a second temperature detector configured to detect a temperature of the drive motor; and
a controller configured to:
identify a target rotational speed of the oil pump corresponding to the detected temperature of the oil and the temperature of the drive motor,
when the identified target rotational speed is greater than or equal to a limit rotational speed, adjust the identified target rotational speed based on a temperature gradient of the drive motor in a current period and a temperature gradient of the drive motor in a previous period, and
control an operation of the oil pump based on the adjusted target rotational speed.

2. The vehicle according to claim 1, further comprising:
a storage configured to store information about the target rotational speed matched in response to the detected temperature of the oil and the temperature of the drive motor as a reference map,
wherein the controller is configured to identify the target rotational speed through the reference map when the identified target rotational speed is less than the limit rotational speed.

3. The vehicle according to claim 1, wherein when the temperature gradient of the drive motor in the current period is less than the temperature gradient of the drive motor in the previous period, the controller is configured to adjust the identified target rotational speed based on a first compensation value.

4. The vehicle according to claim 3, wherein the controller is configured to adjust the identified target rotational speed by adding the identified target rotational speed and the first compensation value.

5. The vehicle according to claim 1, wherein when the temperature gradient of the drive motor in the current period is greater than or equal to the temperature gradient of the drive motor in the previous period, the controller is configured to adjust the identified target rotational speed based on a second compensation value.

6. The vehicle according to claim 5, wherein the controller is configured to adjust the identified target rotational speed by subtracting the second compensation value from the identified target rotational speed.

7. The vehicle according to claim 1, further comprising:
a power converter connected to a battery, the power converter configured to convert electric power charged in the battery into power for driving the drive motor and the oil pump.

8. The vehicle according to claim 1, further comprising:
a cooling water receptor configured to supply cooling water; and
a heat exchanger disposed adjacent to an oil passage connected to the oil pump and disposed in a cooling water passage of the cooling water receptor, the heat exchanger configured to perform heat exchange between the oil and the cooling water.

9. The vehicle according to claim 1, further comprising:
a filter provided between the drive motor and the oil pump, the filter configured to remove impurities of the oil delivered to the oil pump.

10. The vehicle according to claim 1, further comprising:
a current detector configured to detect a current flowing through the drive motor, and a speed detector configured to detect a rotational speed of the drive motor,
wherein the controller is configured to:
obtain a driving torque of the drive motor based on the detected current of the drive motor and the detected rotational speed of the drive motor,
when the obtained driving torque is greater than or equal to a reference torque, set a limit rotational speed based on a first ratio, and
when the obtained driving torque is less than the reference torque, set the limit rotational speed based on a second ratio.

11. An oil pump comprising:
a driver connected through communication with a controller provided in a vehicle, the driver configured to receive power for driving from a power converter provided in the vehicle;
a pump motor configured to operate by a control command of the driver; and
a temperature detector configured to detect a temperature of oil,
wherein the driver is configured to:
when a temperature of a drive motor is received, identify a target rotational speed of the oil pump corresponding to the detected temperature of the oil and the received temperature of the drive motor,
when the identified target rotational speed is greater than or equal to a limit rotational speed, adjust the identified target rotational speed based on a temperature gradient of the drive motor in a current period and a temperature gradient of the drive motor in a previous period, and
control an operation of the pump motor based on the adjusted target rotational speed.

12. The oil pump according to claim 11, further comprising:
a storage configured to store information about the target rotational speed matched in response to the detected temperature of the oil and the temperature of the drive motor as a reference map,
wherein the controller is configured to identify the target rotational speed through the reference map when the identified target rotational speed is less than the limit rotational speed.

13. The oil pump according to claim 11, wherein the controller is configured to:
when the temperature gradient of the drive motor in the current period is less than the temperature gradient of the drive motor in the previous period, adjust the identified target rotational speed based on a first compensation value; and
when the temperature gradient of the drive motor in the current period is greater than or equal to the temperature gradient of the drive motor in the previous period, adjust the identified target rotational speed based on a second compensation value.

14. The oil pump according to claim 13, wherein the controller is configured to:
adjust the identified target rotational speed by adding the identified target rotational speed and the first compensation value; and
adjust the identified target rotational speed by subtracting the second compensation value from the identified target rotational speed.

15. The oil pump according to claim 11, further comprising:
a filter configured to remove impurities of the oil delivered from the drive motor to the oil pump.

16. A method of controlling a vehicle, the vehicle including a drive motor configured to apply a driving power to wheels, and an oil pump configured to cool the drive motor, the method comprising:
detecting, by a first temperature detector, a temperature of oil;
detecting, by a second temperature detector, a temperature of the drive motor;
identifying, by a controller, a target rotational speed of the oil pump corresponding to the detected temperature of the oil and the temperature of the drive motor;
when the identified target rotational speed is less than a limit rotational speed, controlling, by the controller, an operation of the oil pump based on the identified target rotational speed; and
when the identified target rotational speed is greater than or equal to a limit rotational speed, adjusting, by the controller, the identified target rotational speed based on a temperature gradient of the drive motor in a current period and a temperature gradient of the drive motor in a previous period and controlling the operation of the oil pump based on the adjusted target rotational speed.

17. The method according to claim 16, wherein adjusting the identified target rotational speed comprises:
when the temperature gradient of the drive motor in the current period is less than the temperature gradient of the drive motor in the previous period, adjusting the identified target rotational speed by adding a first compensation value to the identified target rotational speed; and
when the temperature gradient of the drive motor in the current period is greater than or equal to the temperature gradient of the drive motor in the previous period, adjusting the identified target rotational speed by subtracting a second compensation value from the identified target rotational speed.

18. The method according to claim 16, further comprising:
detecting a current flowing through the drive motor;
detecting a rotational speed of the drive motor;
obtaining a driving torque of the drive motor based on the detected current of the drive motor and the detected rotational speed of the drive motor;
when the obtained driving torque is greater than or equal to a reference torque, setting a limit rotational speed based on a first ratio; and
when the obtained driving torque is less than the reference torque, setting the limit rotational speed based on a second ratio.

19. The method according to claim 16, wherein the limit rotational speed is a speed corresponding to a certain ratio of a maximum rotational speed of a pump motor provided in the oil pump.

20. The method according to claim 16, further comprising:
when the identified target rotational speed is less than the limit rotational speed in a state where the temperature gradient of the drive motor in the current period is greater than or equal to the temperature gradient of the drive motor in the previous period, adjusting the identified target rotational speed based on a first compensation value.

* * * * *